(12) United States Patent
Cunningham (10) Patent No.: US 12,208,840 B2
(45) Date of Patent: Jan. 28, 2025

(54) VEHICLE SWING RACK

(71) Applicant: THI CANADA, INC., Oakville (CA)

(72) Inventor: Michael Cunningham, Milton (CA)

(73) Assignee: EXTANG CORPORATION, Ann Arbor, MI (US)

( * ) Notice: Subject to any disclaimer, the term of this patent is extended or adjusted under 35 U.S.C. 154(b) by 318 days.

(21) Appl. No.: 17/856,045

(22) Filed: Jul. 1, 2022

(65) Prior Publication Data

US 2024/0001999 A1    Jan. 4, 2024

(51) Int. Cl.
*B62D 33/02* (2006.01)
*B60R 9/06* (2006.01)

(52) U.S. Cl.
CPC ............ *B62D 33/0207* (2013.01); *B60R 9/06* (2013.01)

(58) Field of Classification Search
CPC ................................ B62D 33/0207; B60R 9/06
USPC .......................................................... 280/769
See application file for complete search history.

(56) References Cited

U.S. PATENT DOCUMENTS

| | | | |
|---|---|---|---|
| 5,037,152 A * | 8/1991 | Hendricks | B60R 9/00 296/26.06 |
| 5,190,337 A | 3/1993 | McDaniel | |
| 5,431,472 A * | 7/1995 | Coffland | B60R 9/00 296/10 |
| 5,439,152 A * | 8/1995 | Campbell | B60R 9/00 211/195 |
| 5,499,762 A | 3/1996 | Lee | |
| 6,059,159 A | 5/2000 | Fisher | |
| 6,644,704 B1 * | 11/2003 | Nyberg | B60P 3/40 296/3 |
| 7,419,075 B2 | 9/2008 | Green | |
| 7,758,091 B1 * | 7/2010 | McCall | B60P 3/40 296/3 |
| 9,132,784 B2 * | 9/2015 | Harrison | B60R 9/045 |
| 9,713,978 B2 * | 7/2017 | Petru | B60P 7/135 |
| 10,131,287 B1 * | 11/2018 | Marino | B60R 9/045 |
| 10,358,170 B2 | 7/2019 | Khatri et al. | |
| 10,421,385 B2 | 9/2019 | Chambers | |
| 10,507,874 B2 * | 12/2019 | Crandall | B62D 33/0207 |
| 10,562,461 B2 * | 2/2020 | Pacella | B60R 9/045 |
| 10,870,453 B2 * | 12/2020 | Elder | B60R 9/052 |
| 11,034,307 B1 | 6/2021 | Cunningham | |
| 11,230,326 B2 * | 1/2022 | Elder | B62D 33/0222 |
| 2004/0134953 A1 * | 7/2004 | Perez | B60P 3/40 224/403 |
| 2005/0093320 A1 | 5/2005 | Brauer et al. | |
| 2008/0129067 A1 * | 6/2008 | Rios | B60J 7/1621 296/3 |

(Continued)

OTHER PUBLICATIONS

Co-pending U.S. Appl. No. 17/722,701, filed Apr. 18, 2022.

(Continued)

*Primary Examiner* — Hau V Phan (57) ABSTRACT

A rack of a vehicle comprising: (a) a mounting bracket adapted to mount the rack to a top edge of a cargo box of the vehicle; (b) an upright pivotally secured to the mounting bracket; and (c) a crossmember secured to the first upright, wherein the crossmember is adapted to span substantially across a width between opposing sides of the cargo box; wherein the rack is adapted to pivot between a stowed position and an extended position by pivoting the upright relative to the mounting bracket.

20 Claims, 4 Drawing Sheets

(56) References Cited

U.S. PATENT DOCUMENTS

| | | |
|---|---|---|
| 2011/0108590 A1 | 5/2011 | Kennedy et al. |
| 2014/0197653 A1* | 7/2014 | Stepanians ............... B60P 3/40 |
| | | 296/3 |
| 2017/0361877 A1 | 12/2017 | Corona |
| 2018/0154817 A1* | 6/2018 | Chambers ............ B62D 33/023 |
| 2019/0210663 A1* | 7/2019 | Binley ..................... B60P 3/40 |
| 2020/0398764 A1 | 12/2020 | Ni et al. |

OTHER PUBLICATIONS

Canadian Office Action dated Oct. 20, 2023, for Canadian Patent Application 3,168,584.
Canadian Office Action dated Apr. 4, 2024, for Canadian Patent Application 3,168,584.

* cited by examiner

VEHICLE SWING RACK

FIELD

The present teachings generally relate to a vehicle rack, and more particularly, to a collapsible vehicle rack.

BACKGROUND

Vehicle accessories, and particularly, accessories for vehicles having a cargo box, have become increasingly prominent. Often times vehicles having a cargo box, such as a pickup truck, will have one or more accessories fixed directly to a portion of the cargo box. The accessories may be fixed within the confines of the vehicle, may be secured along walls defining the cargo box, or both. For example, a headache rack may be disposed across a width of the cargo box and secured along a top edge of the cargo box by one or more brackets. The headache rack may be positioned behind a cab of the vehicle and be capable of bearing a load to protect a passenger within the cabin or help secure one or more items within the cargo box. It should be noted that many accessories may be secured to the cargo box, such as a toolbox, tonneau cover, cargo net, step, tie down connectors, or a combination thereof.

Conventional attachment mechanisms to secure the accessories to the cargo box often require permanent modification to the cargo box. For example, a top edge and/or a panel of the cargo box may be refabricated to permanently mount the accessories. One or more brackets may be drilled, welded, or otherwise secured to the top edge and/or the panel of the cargo box. As a result, if an accessory is ever to be removed, the cargo box may have permanent deformation or holes, leaving an aesthetically displeasing surface, risk of degradation to the cargo box or interior of the vehicle, or both. Additionally, refabricating of the cargo box may require an extensive amount of time and/or money and may often need to be completed by a professional in the industry. Furthermore, mounting of many conventional accessories such as a rack requires the rack to be fixed in place. As a result, the rack may protrude from the cargo box even when no in use, thereby increasing the overall footprint of the cargo box. Moreover, based on the above installation techniques often utilized, the racks or other accessories may often be configured for a specific vehicle, thereby requiring a user to buy a replacement rack or other accessory if a new vehicle were to be purchased.

Thus, given the aforementioned issues, there remains a need for a mounting mechanism to securely mount an accessory such as a rack to a cargo box of a vehicle. What is needed is a rack secured to a portion of a cargo box to prevent movement, rattling, vibration, or a combination thereof of the rack during operation of the vehicle. There also remains a need for a bracket to mount the rack without requiring refabricating of the cargo box. Therefore, what is needed is a bracket that may mount directly to existing features of the cargo box. Additionally, there remains a need for a rack that may quickly and easily attach to a cargo box of a vehicle and allow for movement of the rack. Accordingly, what is needed is a rack that may be mounted to a cargo box in a collapsible manner.

SUMMARY

The present teachings meet one or more of the present needs by providing a rack of a vehicle comprising: (a) a mounting bracket adapted to mount the rack to a top edge of a cargo box of the vehicle; (b) an upright pivotally secured to the mounting bracket; and (c) a crossmember secured to the first upright, wherein the crossmember is adapted to span substantially across a width between opposing sides of the cargo box; wherein the rack is adapted to pivot between a stowed position and an extended position by pivoting the upright relative to the mounting bracket.

The rack may include a pin that extends through aligned pin holes of the upright and the mounting bracket to secure the rack in the stowed position. The mounting bracket may include a first pin hole associated with securing the rack in the stowed position and a second pin hole associated with securing the rack in the extended position. The upright may include a single pin hole that aligns with the first pin hole of the mounting bracket in the stowed position and also aligns with the second pin hole of the mounting bracket in the extended position. The first pin hole of the mounting bracket may be located near a connection point between the upright and the mounting bracket. The second pin hole of the mounting bracket may be located on a support bracket connected to the mounting bracket, whereby the support bracket may be adapted to support the upright when in the stowed position. The support bracket may include a receiving portion that receives the upright so that the upright may be supported by a bumper located within the receiving portion. Additionally, the support bracket may extend substantially perpendicular to the top edge of the cargo box. Moreover, the upright may include a bumper that abuts the mounting bracket when the rack is in the extended position.

The mounting bracket may include a channel that receives a lip of the cargo box located beneath the top edge so that the upright may be positioned substantially above the top edge. A retaining fastener may extend into the channel of the mounting bracket to engage the lip of the cargo box, thereby securing the mounting bracket to the cargo box. Furthermore, the pin may include a clip that prevents unwanted removal of the pin when secured within the aligned pin holes of the upright and the mounting bracket. The upright may include a plurality of mounting holes to secure the crossmember at multiple heights relative to the cargo box. The crossmember may be secured to the upright by a crossmember bracket fastened to the mounting holes. The crossmember may extend through a cutout of the crossmember bracket, and the crossmember bracket may include a tab that is biased against a surface of the crossmember via a biasing member to secure the crossmember in place. Furthermore, the rack may be adapted for mounting to cargo boxes having varying widths by adjusting a location of the crossmember bracket along the crossmember.

The preset teachings may also meet one or more of the present needs by providing a rack of a vehicle comprising: (a) a first mounting bracket and a second mounting bracket adapted to mount the rack to a top edge of a cargo box of the vehicle; (b) a first upright pivotally secured to the first mounting bracket and a second upright pivotally secured to the second mounting bracket; and (c) a crossmember secured to and spanning between the first upright and the second upright, wherein the crossmember is adapted to span substantially across a width between opposing sides of the cargo box; wherein the rack is adapted to pivot between a stowed position and an extended position.

A width of the rack may be adjustable to accommodate mounting of the rack to various cargo box sizes. The width of the rack may be adjusted by adjusting a location of crossmember brackets along the crossmember that secure the crossmember to the first upright and the second upright.

Additionally, the pair of racks may be adapted to support one or more objects spanning between the pair of racks.

The present teachings meet one or more of the present needs by providing: a mounting mechanism to securely mount an accessory such as a rack to a cargo box of a vehicle; a rack secured to a portion of a cargo box to prevent movement, rattling, vibration, or a combination thereof of the rack during operation of the vehicle; a bracket to mount the rack without requiring refabricating of the cargo box; a bracket that may mount directly to existing features of the cargo box; a rack that may quickly and easily attach to a cargo box of a vehicle and allow for movement of the rack; a rack that may be mounted to a cargo box in a collapsible manner; or a combination thereof.

DETAILED DESCRIPTION

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the description herein, but should instead be determined with reference to the appended claims, along with the full scope of equivalents to which such claims are entitled. The disclosures of all articles and references, including patent applications and publications, are incorporated by reference herein in their entirety for all purposes. Other combinations are also possible as will be gleaned from the following claims, which are also hereby incorporated by reference into this written description.

The present teachings generally relate to accessories of a vehicle. More particularly, the present teachings may generally relate to an accessory, such as a vehicle rack, adapted for communication with a cargo box of a vehicle However, while a vehicle rack is described for illustrative purposes, the mounting methodology and structure described herein to mount the vehicle rack may also be adapted for mounting various other accessories, such as a toolbox, tool rack, tonneau cover, roll bar, secondary lighting, other accessories, or a combination thereof. As such, it may be gleaned from the present teachings that the features herein may not be limited to just a vehicle rack.

The cargo box may be defined by one or more walls, panels, sides, or a combination thereof forming an inner portion of the cargo box. The inner portion may be used to store one or more items, transport one or more items, or a combination thereof. The walls, panels, sides, or a combination thereof of the cargo box may extend from a supporting surface of the inner portion of the cargo box and may terminate at a top. The walls may be formed from one or more panels. For example, each wall of the cargo box may be formed from an outer fender of the vehicle and an inner panel. The walls may be at least partially hollow, may include one or more attaching features, or both. For example, the walls may include a tie-down mount, clip, receiving feature, fastener, hook, hole, nut, or a combination thereof.

The cargo box formed by the one or more walls, panels, sides, or a combination thereof may include a lip. The lip may be formed with or otherwise created by connection of the one or more walls, panels, sides, or a combination thereof. The lip may extend entirely or partially around a perimeter of the cargo box. The lip may be located along an exterior wall or an interior wall. For example, the lip may be positioned along an inner perimeter of the cargo box such that the lip is located within the confines of the cargo box. The lip may also be located near or beneath a top edge of the cargo box to facilitate engagement of the lip for mounting a rack of the vehicle that may at least partially rest upon the top edge of the cargo box.

The rack may function to support one or more accessories being carried by the vehicle. The rack may secure one or more accessories, items, etc. during transportation, such as one or more items that may be oversized and be unable to fit within the confines of the cargo box. However, the rack may be utilized in any desired manner to accommodate additional usability of the cargo box.

The rack may be fixed to the cargo box to maintain a position of the rack during movement of the vehicle. However, the rack may beneficially be secured to the cargo box free of fabrication or deformation of the cargo box. That is, the rack may be secured to the cargo box in manner that facilitates easy removal and/or installation of the rack.

The rack may be collapsible. As such, the rack may move between an extended position and a stowed position. The extended position may be defined as a position where the rack extends or otherwise projects away from the cargo box. The stowed position may be defined as a position where the rack is at least partially collapsed to be positioned substantially on an upper surface of the cargo box. That is, in the stowed position, the rack may be folded down to no long project substantially away from the cargo box. As such, the rack may be secured in both the extended position and the stowed position. Similarly, the rack may be secured in one or more positioned therebetween.

The rack may include one or more uprights. The uprights may function as a connection member between a mounting bracket and the rack to secure the rack to the cargo box. The uprights may thus be pivotable relative to the mounting bracket or otherwise collapsible to accommodate movement of the rack between the extended position and the stowed position. Additionally, the uprights may be structural members of the rack to at least partially form an overall structure of the rack.

To facilitate pivoting of the uprights and maintaining a position of the rack (e.g., in the extended position and/or the stowed position), the uprights may include one or more bends, one or more arms, one or more curvatures, one or more arcuate portions, one or more linear portions, or a combination thereof. For example, the uprights may include a bend or arm that is adapted to rest along the mounting bracket while the rack is in an extended position, thereby maintaining a position of the upright and the overall rack. Similarly, the uprights may also engage the mounting bracket in a stowed position where a linear segment of the uprights is supported by the mounting bracket. Additionally, to improve structural integrity of the uprights or the overall rack, the uprights may include a reinforcement, such as a gusset, rib, localized reinforcing member, etc., anywhere along the uprights to ensure stability of the rack.

The uprights may also be adapted to connect with one or more crossmembers. The crossmember may function as a primary support to support one or more accessories, one or more items, or both. The crossmember may function to interconnect uprights to form the overall rack structure. For example, the rack may include a pair of opposing uprights that connect to opposing mounting brackets. As such, the mounting brackets may be secured to opposing sides of the cargo box such that the opposing uprights are secured to their respective mounting brackets and the crossmember extends therebetween. As a result, the crossmember may span a portion or all of a width of the cargo box as defined by the distance between opposing walls of the cargo box (e.g., between opposing side walls or upper edges of the cargo box).

The crossmembers and the uprights may have similar structures or different structures. For example, the crossmembers and/or the uprights may be solid or may be hollow. The crossmembers and/or the uprights may be a tube, such as a round or square tube. However, the crossmembers and the uprights are not limited to any specific type of tubing.

The crossmember may be connected to the uprights by a crossmember bracket. The crossmember bracket may function to removably secure the crossmember to one or more uprights. That is, it is envisioned that the crossmember bracket may advantageously facilitate connection and disconnection of the crossmember from the one or more uprights without damage to the crossmember. Similarly, the crossmember bracket may also allow for connection and disconnection of the crossmember free of tools. For example, the crossmember bracket may include a biasing member or engaging mechanism that may be tightened and loosened by hand, thereby allowing for connection, disconnection, adjustment, or a combination thereof of the crossmember within the rack.

The crossmember bracket may include one or more cutouts. The cutouts may function to receive a portion of the crossmember therein. As a result, the crossmember bracket may be secured to an upright via one or more fasteners or other connection means, and the crossmember may then be inserted into the cutouts to connect the crossmember to the upright, or vice versa. As such, the crossmember bracket may beneficially allow for mounting of the rack to a variety of cargo boxes. That is, the crossmember bracket may facilitate mounting of the rack in a universal manner to cargo boxes that may have varying dimensions. For example, the crossmember may be inserted into the cutouts of the crossmember bracket so that the crossmember bracket may slide along a length of the crossmember until it reaches the proper location to mount the crossmember to the upright.

For illustrative purposes, a crossmember may include a pair of crossmember brackets that secure the crossmember to opposing uprights. The crossmember may extend between the crossmember brackets so that the crossmember is positioned within cutouts of each of the crossmember brackets. As a result, if a vehicle has a narrower cargo box, the crossmember brackets may be located closer together along a length of the crossmember to accommodate the shorter distance between opposing sides of the cargo box (e.g., where the mounting brackets and uprights may be mounted). Similarly, that same crossmember and rack may be mounted to a wider cargo box by simply moving the crossmember brackets farther away from each other along the length of the crossmember, thereby accommodating a greater width between opposing sides of the cargo box (e.g., where the mounting brackets and uprights may be mounted). Thus, a skilled artisan would glean from the present teachings that the rack as described herein may provide a universal solution to accommodate mounting of the rack to various vehicles with different cargo box geometries, dimensions, etc.

As discussed above, the rack may be configured to support or carry one or more accessories, items, or both. To further customize a cargo box, a plurality of racks may be mounted to the cargo box such that the one or more accessories, items, or both may span between the racks and be supported. As such, use of multiple racks (e.g., a first rack and a second rack) may allow for transport of oversized items, such as a ladder, canoe, kayak, lumber, drywall, pipes, tubing, etc. For example, a cargo box may include a first rack mounted near a cabin of the vehicle and a second rack mounted rearward near a tailgate of the vehicle. As a result, oversized items such as those mentioned above may be supported near opposing ends by the first rack and the second rack. Thus, the oversized items may also no longer take up space within the cargo box, thereby increasing storage space for transportation.

To ensure the one or more racks are secured properly to the cargo box, the mounting bracket of the rack may be positioned at least partially along the upper surface formed by the upper edge of the cargo box. As such, the mounting bracket may function as a connection point between the rack and the cargo box. More specifically, it is envisioned that the mounting bracket may act as an intermediary between the upright of the rack and the cargo box to maintain a position of the rack relative to the cargo box yet still allow for movement (e.g., pivoting, hinging, etc.) of the rack relative to the mounting bracket. For example, the mounting bracket may be secured to the cargo box yet still allow for pivoting of the upright relative to the mounting bracket so that the rack may move between the extended position and the stowed position, or vice versa.

As mentioned above, the mounting bracket may beneficially facilitate securement of the rack to the cargo box free of fabrication and/or deformation of the cargo box. That is, the mounting bracket may be secured to the cargo box without any modifications to the existing cargo box geometry that would result in permanent change. Therefore, the mounting bracket may be adapted for mounting in any manner to the cargo box (e.g., mounting to an inner panel of the cargo box, an upper edge or top surface of the cargo box, a tailgate of the cargo box, a bulkhead of the cargo box, or a combination thereof) without fabrication.

One particular mounting configuration may include the mounting bracket being supported along the top edge or top surface of the cargo box so that at least a portion of the mounting bracket rests along the top edge or top surface. To secure the mounting bracket along the top edge or top surface, the mounting bracket may include a channel that receives a lip of the cargo box located beneath the top edge or top surface. As a result, the channel wraps around the lip of the cargo box and engages the lip to maintain a position of the mounting bracket. Thus, the channel may function as a receiving portion to at least partially engage the lip. The channel may also function to align the mounting bracket with the cargo box so that an upper portion of the mounting bracket may be positioned along the top edge or top surface of the cargo box in a substantially flush manner.

The channel may vary in shape to accommodate different lip geometries of the cargo box. For example, the channel may be U-shaped, V-shaped, D-shaped, G-shaped, or a combination thereof. The channel may also include a lip extending from the channel to further engage the lip of the cargo box, thereby further preventing unwanted disconnection between the mounting bracket and the cargo box. In maintaining a position of the mounting bracket along the top edge or top surface of the cargo box, the mounting bracket may thus be biased against the top surface or top edge of the cargo box.

For example, one or more retaining fasteners may be located within the channel. The retaining fasteners may function to engage a portion of the lip of the cargo box or otherwise engage a portion of the cargo box located beneath top edge or top surface of the cargo box. The retaining fasteners may extend through a wall of the channel to contact the lip of the cargo box, thereby biasing the upper portion of the mounting bracket against top surface or top edge of the cargo box. The retaining fasteners may extend into one or more holes on the cargo box or may contact a surface of the cargo box to bias the mounting bracket. While the retaining fasteners may be any mechanical fastener, it is envisioned that the retaining fastener may be a screw, bolt, pin, or a combination thereof.

Similarly, the retaining fasteners may work in conjunction with one or more retaining nuts. The retaining nuts may function to receive the retaining fasteners and maintain a position of the retaining fasteners within the channel. As a result, the nuts may lock the retaining fasteners in a position to bias the mounting bracket against the top edge or top surface of the cargo box. The retaining nuts may be a lock nut or other type of nut. The retaining nuts may be located within the channel, outside the channel, or both. For example, a pair of retaining nuts positioned on opposing sides of a channel wall my both receive the retaining fastener to secure the retaining fastener and thus the mounting bracket in place.

Once the mounting bracket is properly secured to the cargo box, the upright connected thereto may move relative to the mounting bracket to position the rack in the extended position or the stowed position. To accommodate movement of the upright relative to the mounting bracket, the upright and the mounting bracket may create a pivot point or hinge. The pivot point or hinge may function as a connection point between the mounting bracket and the upright to secure the upright to the mounting bracket yet still allow for pivoting of the upright relative to the mounting bracket. That is, the mounting bracket may remain stationary once secured to the cargo box while the upright may move relative to the mounting bracket to move the rack to a desired position (e.g., a stowed position or an extended position).

The pivot point or hinge may be created by a barrel of the upright. The barrel may function as a mating portion received by the mounting bracket. The barrel may be a channel, drum, cavity, or recess within a portion of the upright that receives a fastening member of the mounting bracket. For example, the fastening member may be a bolt or pin that extends through both the mounting bracket and the barrel to create the pivot point or hinge.

The barrel may be contoured to allow rotation of the barrel about an axis of the fastening member (e.g., a pin). The barrel may be mounted to the mounting bracket in a manner that allows free rotation of the barrel. For example, the barrel may be secured between a flange of the mounting bracket and an attachment bracket secured to the mounting bracket to create the pivot point or hinge. As a result, a channel may be formed between the attachment bracket and the flange of the mounting bracket so that the barrel spans a distance between the attachment bracket and the flange to allow for rotation of the barrel about the fastening member.

Due to the rack allowing for movement between the extended position and the stowed position, the mounting bracket may also include a securing means to secure the rack in both the extended position and the stowed position. The securing means may be a locking mechanism that locks the upright in place relative to the mounting bracket. To do so, the locking mechanism may lock the upright to the mounting bracket.

For example, the locking mechanism may be a pin. The pin may function to lock the upright in place by extending through both the upright and the mounting bracket to prevent movement of the upright relative to the mounting bracket when the upright is in the extended position or the stowed position. Advantageously, it is envisioned that a common pin may be used for locking the upright in either position. However, a plurality of pins may also be used.

Figure 1A:
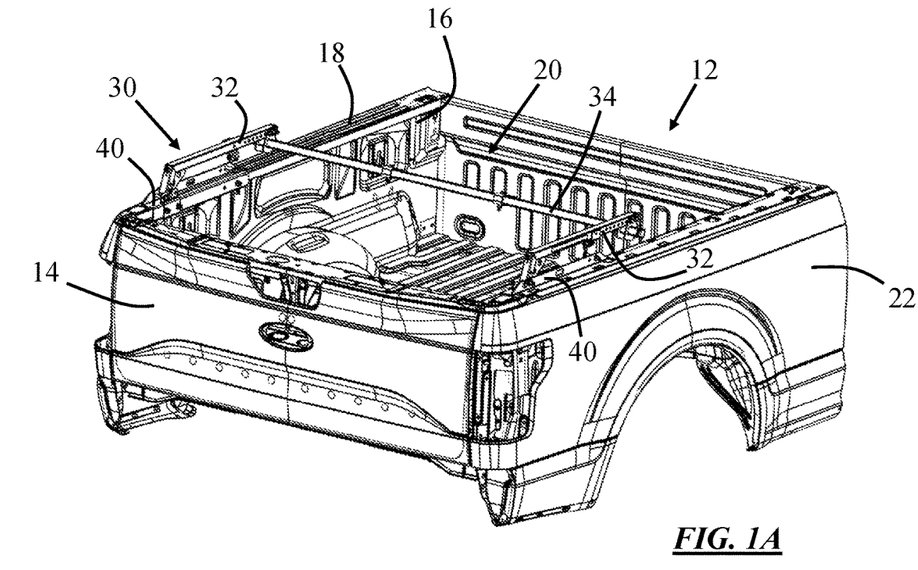
FIG. 1A is a perspective view of a vehicle cargo box having a rack in a stowed position in accordance with the present teachings.
Figure 1B:
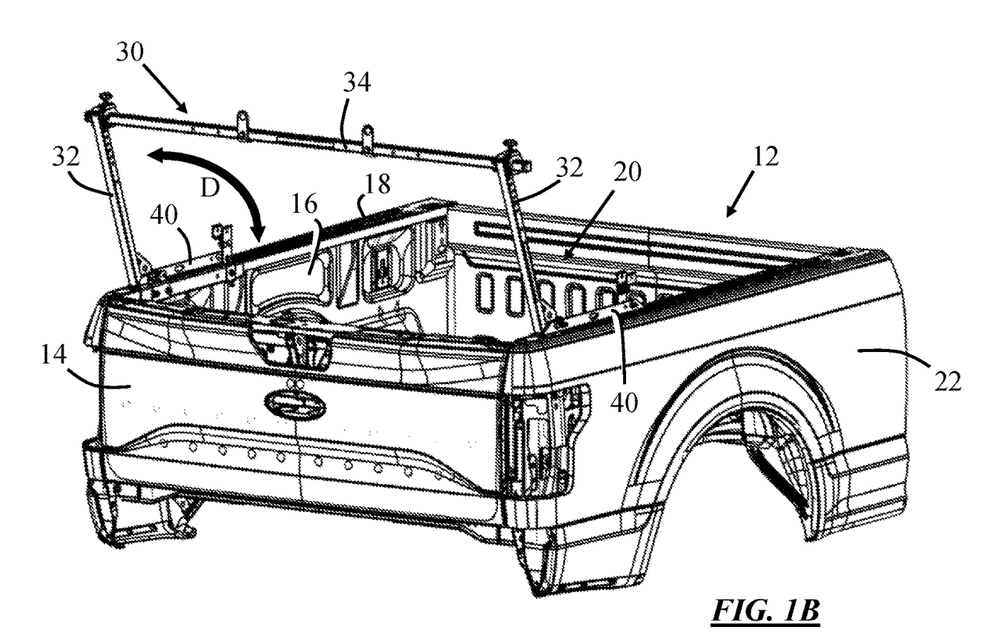
FIG. 1B is a perspective view of a vehicle cargo box having a rack in an extended position in accordance with the present teachings.

Turning now to the figures, FIGS. 1A and 1B illustrate perspective views of a cargo box 12 having a rack 30 secured to the cargo box 12. FIG. 1A illustrates the rack 30 in a stowed position while FIG. 1B illustrates the rack 30 in an extended position.

The rack 30 may include a pair of uprights 32 pivotally engaged to opposing mounting brackets 40 to allow for rotation of the uprights 32 relative to the mounting brackets 40. The mounting brackets 40 may be secured to the cargo box 12 so that at least a portion of the mounting brackets 40 are supported along a top edge 18 of the cargo box 12 formed between terminal edges of an outer fender 22 of the cargo box 12 and an inner panel 16 of the cargo box 12 located within an interior 20 of the cargo box 12. As a result, the uprights 32 may be positioned substantially above the top edge 18 without extending into the interior 20 of the cargo box 12.

The uprights 32 and the mounting brackets 40 may be positioned across from each other on opposing sides of the cargo box 12 so that a crossmember 34 may extend between the uprights 32 to form the rack 30. The mounting brackets 40 may be aligned on opposing sides of the cargo box 12 so that the crossmember 34 extends substantially parallel to the tailgate 14 of the cargo box 12. That is, the crossmember 34 may be positioned substantially perpendicular to the inner panels 16 or outer fenders 22 of the cargo box 12.

As mentioned above, the rack 30 may move between the stowed position (FIG. 1A) and the extended position (FIG. 1B). To do so, a locking mechanism (not shown) may be disengaged so that the uprights 32 may move in the direction (D) between the stowed position and the extended position, or vice versa. In the extended position, the crossmember 34 may be positioned above the cargo box a desired distance free of interference with the interior 20 of the cargo box. However, advantageously the rack 30 may be easily moved to the stowed position where the crossmember 34 is positioned near the top edge 18 of the cargo box 12 to minimize the overall projection of the rack 30 above the cargo box 12.

Additionally, it should be noted that while a tonneau cover is not illustrated in FIGS. 1A and 1B, the rack 30 as described herein may advantageously be utilized with a tonneau cover of the cargo box. That is, the rack 30 may be used with various tonneau covers free of intrusion on the tonneau cover. For example, the tonneau cover may be a soft cover, a hard cover, a foldable cover, a rollable cover, a manual cover, an automatic cover, or a combination thereof. However, in each case the rack 30 may beneficially be mounted as described below so that operation of the tonneau cover is not obstructed by the rack 30. To facilitate operation of the tonneau cover, the mounting brackets of the tonneau cover may be located outside of an area of operation of the tonneau cover. For example, the mounting brackets may be located beneath a rail of the tonneau cover or outside of the rail of the tonneau cover. Thus, the rack 30 may advantageously be combined with a tonneau cover to provide even further customization and storage means for the cargo box.

Figure 2:
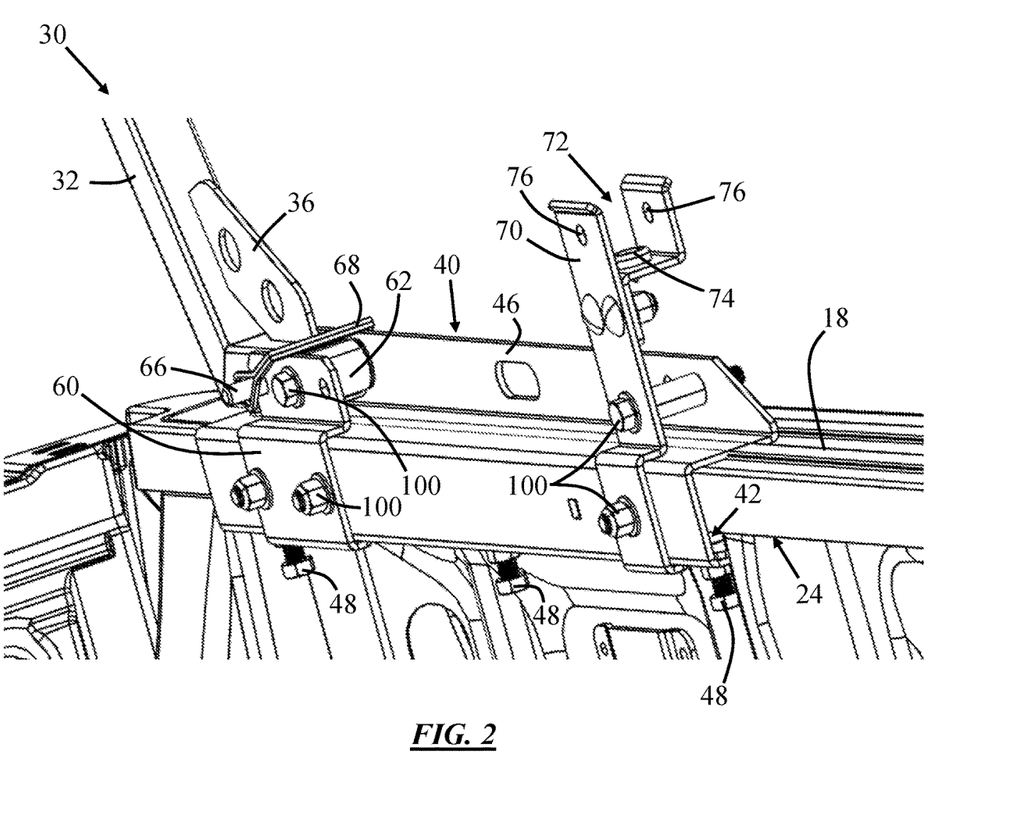
FIG. 2 is a close-up view of a rack mounting bracket secured to a vehicle cargo box.

FIG. 2 illustrates a close-up view of a mounting bracket 40 that secured the rack 30 to the cargo box. As discussed above, a plurality of mounting brackets 40 may secure a plurality of uprights 32 of the rack. However, for simplicity, a single mounting bracket 40 is illustrated.

The mounting bracket 40 may be positioned along a top edge 18 of the cargo box so that the upright 32 of the rack 30 is located directly above the top edge 18. To maintain a position of the mounting bracket 40, a channel 42 of the mounting bracket 40 may receive a lip 24 of the cargo box. The lip 24 may be located beneath the top edge 18 and project inwards into the interior of the cargo box away from an inner panel of the cargo box. As a result, the channel 42 may engage the lip 24 while an upper portion of the mounting bracket 40 rests along the top edge 18 of the cargo box.

Once the channel 42 of the mounting bracket 40 receives the lip 24, a plurality of retaining fasteners 48 may extend through the channel 42 to engage the lip 24 of the cargo box and bias the mounting bracket against the top edge 18. As a result, a position of the mounting bracket 40 may be maintained without altering the structure of the cargo box or otherwise requiring permanent deformation of the cargo box.

After the mounting bracket 40 is secured to the cargo box, the upright 32 and thus the rack 30 may be moved between the extended position and the stowed position. To facilitate movement of the upright 32, the upright 32 may be secured to the mounting bracket 40 using a barrel 62 of the upright 32. The barrel 62 may be located near a terminal or proximal end of the upright 32. The barrel 62 may be positioned between a flange 46 of the mounting bracket 40 and an attachment bracket 60. That is, the attachment bracket 60 and the flange 46 may form a channel that receives the barrel 62 and allows for rotation of the upright 32 relative to the mounting bracket 40. Similarly, the attachment bracket 60 may function to secure the upright 32 (e.g., the barrel 62) to the mounting bracket 40. For example, the attachment bracket 60 may be secured to the mounting bracket 40 by a plurality of mounting fasteners 100 so that an additional mounting fastener 100 may extend through the attachment bracket 60 and into the barrel 62 of the upright 32. Thus, the barrel 62 may rotate about the mounting fastener 100 to allow for movement of the upright 32 between the extended position and the stowed position.

As shown, the upright 32 is in an extended position where the upright extends away from the top edge 18 (see FIG. 1B). To maintain this position, a portion of the upright 32 may rest along the mounting bracket 40 or the top edge 18 of the cargo box. Similarly, the upright 32 may include a gusset 36 or other structural reinforcement that aids with maintaining a position of the upright 32 free of deformation.

To lock the upright 32 in the extended position, a pin 66 may extend through the upright 32 (e.g., a hole therein) to secure the upright 32 to both the attachment bracket 60 and the flange 46 of the mounting bracket 40. That is, the pin 66 may extend through the attachment bracket 60, into the upright 32, and out of the flange 46 of the mounting bracket 40. Similarly, a clip 68 or other locking mechanism may be attached or formed with the pin 66 to ensure the pin 66 remains in place during operation of the rack or movement of the vehicle.

Additionally, it should be noted that while a pin 66 is utilized for locking the upright 32 in the extended position, other locking means may be implemented. For example, a mechanical arm or latch may extend across the upright 32 to lock the upright 32. Similarly, an outrigger may extend from the upright 32 to attach to the mounting bracket 40 and maintain the location of the upright 32.

To move the rack 30 from the extended position to the stowed position (as shown in FIG. 1B), the pin 66 and clip 68 may simply be removed from the attachment bracket 60 and the upright 32. Once the pin 66 is removed, the upright 32 may be pivoted about the barrel 62 towards the top edge 18 of the cargo box until a portion of the upright 32 is received by a support bracket 70 of the mounting bracket 40. Specifically, the support bracket 70 may be secured to the mounting bracket 40 by one or more mounting fasteners 100 so that a receiving portion 72 of the support bracket 70 aligns with the upright 32. As a result, as the upright 32 pivots relative to the mounting bracket 40, the upright 32 may be received within the receiving portion 72 of the support bracket 70 until it rests on a bumper 74 located within the receiving portion 72. It should be noted that the bumper 74 may be any rubber stopper, foam, fabric, or other material that aids in supporting the upright 32 while in the stowed position and prevents scraping or rattling between the upright 32 and the support bracket 70.

Once the upright 32 is received by the receiving portion 72, the pin 66 may be inserted into the pin holes 76 of the support bracket 70 and extend through the upright 32, thereby locking the upright 32 in place. Thus, a single pin 66 may be utilized for locking the upright 32 in both the extended position and the stowed position.

Figure 3:
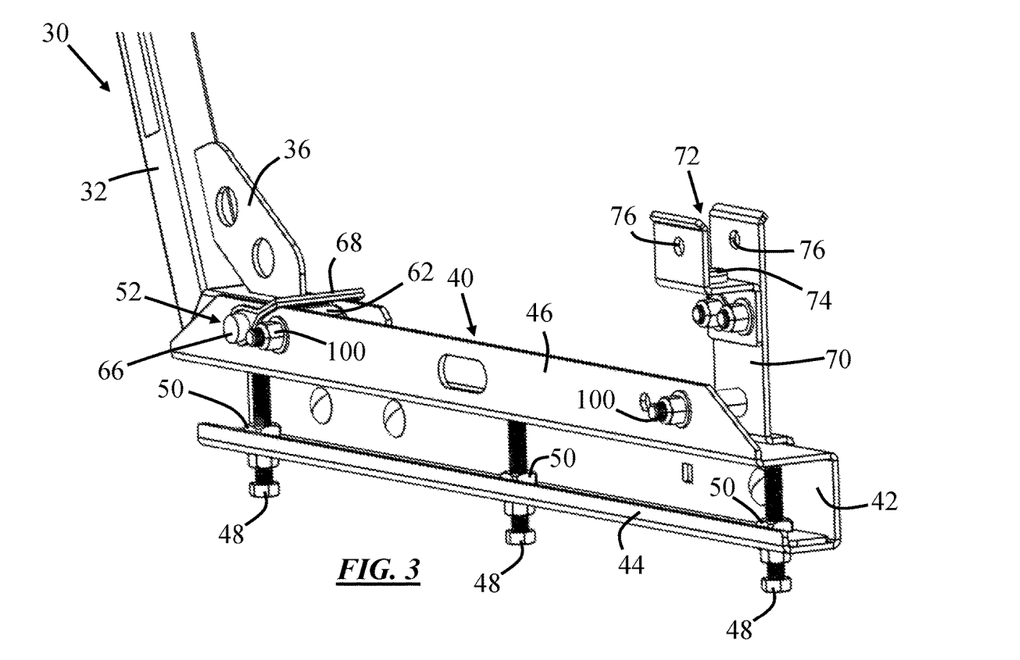
FIG. 3 is a close-up perspective view of a rack in an extended position.
Figure 4:
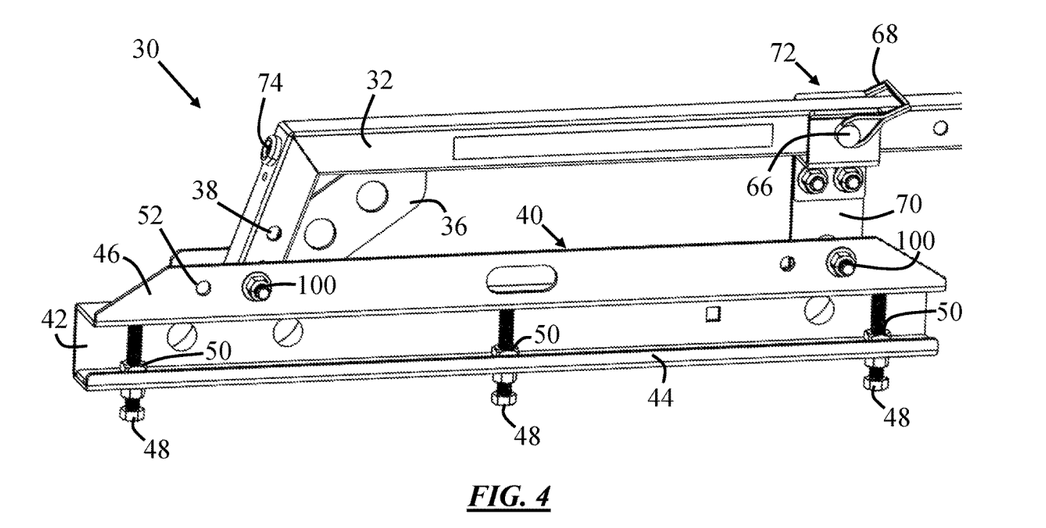
FIG. 4 is a close-up perspective view of the rack of FIG. 3 in a stowed position.

FIG. 3 illustrates a close-up perspective view of the rack 30 in an extended position, such as that shown in FIG. 1B. Similarly, FIG. 4 illustrates a close-up perspective view of the rack 30 in a stowed position, such as that shown in FIG. 1A.

As discussed above, an upright 32 of the rack 30 may be connected to a mounting bracket 40. The mounting bracket 40 may be adapted for securing the rack 30 to a cargo box of a vehicle. To do so, the mounting bracket 40 may include a channel 42 that receives a lip of the cargo box and positioned an upper portion of the mounting bracket 40—including a flange 46 of the mounting bracket 40—along a top edge of the cargo box.

The channel 42 may receive the lip of the cargo box so that a plurality of retaining fasteners 48 may extend through a wall of the channel 42 and engage the lip of the cargo box. For example, the retaining fasteners 48 may extend through one or more retaining nuts positioned inside and/or outside of the channel 42 that maintain a location of the retaining fasteners 48 as the retaining fasteners 48 advance towards and contact the lip of the cargo box. In doing so, the retaining fasteners 48 may engage the lip of the cargo box and create a biasing force between the upper wall of the channel 42 that contacts the top edge of the cargo box and the top edge. Additionally, the channel 42 may include a lip 44 extending along a length of the channel 42 that may also contact the lip of the cargo box. Thus, the lip 44 of the channel 42 may aid in maintaining a location of the mounting bracket 40.

As discussed in detail above, the upright 32 may be connected to the mounting bracket 40 via a hinge or pivot portion. The hinge or pivot portion may be formed by a barrel 62 of the upright being secured between an attachment bracket 70 secured to the mounting bracket and the flange 46 of the mounting bracket 40. In doing so, a mounting fastener 100 may extend between the flange 46 and the attachment bracket through the barrel 62 so that the barrel 62 may rotate about an axis of the mounting fastener 100. For example, the upright 32 may rotate from an extended position where a bend of the upright 32 connected to a linear portion of the upright 32 by a gusset 36 rests upon the mounting bracket 40 (e.g., when a bumper 74 located on the bend of the upright 32 may contact the mounting bracket 40 when in the extended position) to a stowed position where the linear portion of the upright is secured by a support bracket 70.

The support bracket 70 may be secured to the mounting bracket 40 by one or more mounting fasteners 100 so that a receiving portion 72 of the support bracket 70 projects away from the mounting bracket 40 to receive a portion of the upright 32. That is, when the upright 32 moves to the stowed position, a linear portion of the upright 32 may be received by the receiving portion 72 so that the upright 32 rests upon a bumper 74 located within the receiving portion 72.

Additionally, it should also be noted that the upright 32 may be locked in place in either the extended position or the stowed position by a pin 66 having a clip 68. The pin 66 may extend through a pin hole 52 of the mounting bracket located along the flange 46 and/or an attachment bracket and be received within a pin hole 38 of the upright 32 to maintain the position of the upright when in the extended position. Similarly, the same pin 66 or a second pin 66 may extend through pin holes 76 in the support bracket 70 and be received by the same or different pin holes within the upright 32 to secure the upright 32 in the stowed position. In both cases, the clip 68 may also help keep the pin 66 in place when locking the upright 32.

Figure 5:
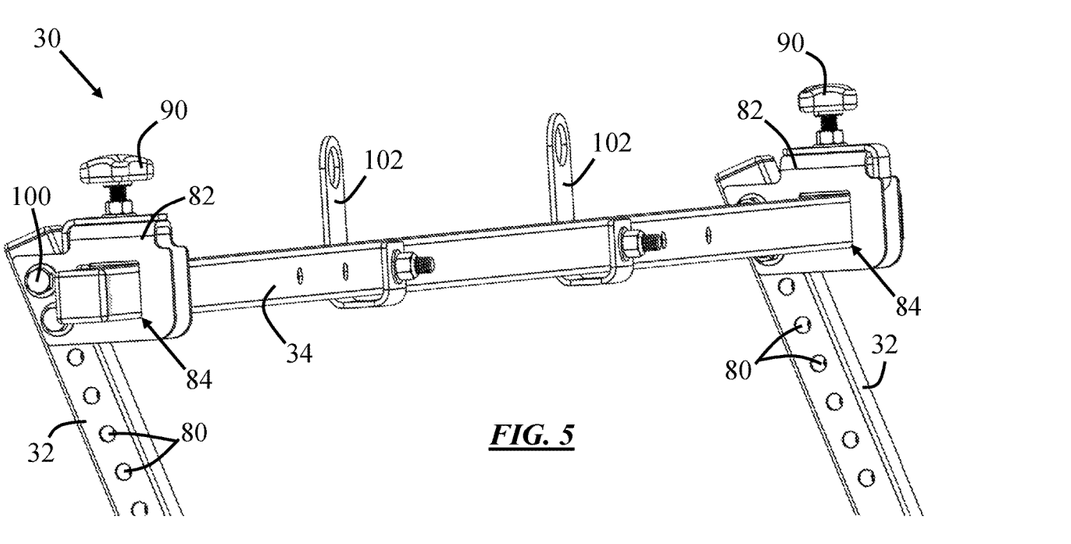
FIG. 5 is a close-up perspective view of a rack.

FIG. 6 illustrates a close-up perspective view of a rack 30 in accordance with the present teachings. As discussed above, the rack 30 may include one or more uprights 32. For example, the rack 30 may include a pair of opposing uprights 32 each secured to their respective mounting brackets, thereby pivotally mounting the rack 30 to the cargo box of a vehicle. It is envisioned that the opposing uprights 32 may be mounted on opposing sides of the cargo box (see, for example, FIGS. 1A and 1B). As a result, a crossmember 34 may span between the uprights 32 and secured to the uprights 32 by crossmember brackets 82. That crossmember brackets 82 may be secured to the uprights 32 by mounting fasteners 100 extending through the crossmember brackets 82 and into mounting holes 80 located on the uprights 32. Advantageously, the uprights 32 may include a plurality of mounting holes 80 to provide various heights in which to mount the crossmember 34, thereby providing even further customization of the rack 30.

Similarly, the crossmember 34 may also include one or more mounting holes to secure secondary attachments 102. The secondary attachments 102 may be a hook, mounting structure, mechanical interlock, bracket, other feature, or a combination thereof that allows for further mounting options along the rack 30 for various items being transported thereon. As a result of the various mounting holes along the crossmember 34, a plurality of secondary attachments 102 may be positioned at various locations along the crossmember 34.

To secure the crossmember 34 to the uprights 32, opposing ends of the crossmember 34 may extend through cutouts 84 of the crossmember brackets 82. Once the crossmember brackets 82 are located within the cutouts 84, biasing members 90 may be manually tightened to clamp down on the crossmember 34 and maintain a location of the crossmember 34. However, it should be noted that alternative mounting options may be possible. For example, the crossmember may be fastened directly to the uprights 32 via one or more fasteners. Similarly, the interlock with the crossmember bracket 82 may be via one or more fasteners as opposed to a biasing member 90.

However, advantageously, the crossmember brackets 82 may facilitate a more universal design of the rack 30. Specifically, the crossmember brackets 82 may allow mounting of the rack 30 to varying dimensions of cargo boxes. For example, if a cargo box is narrower as measured between opposing sides of the cargo box (e.g., measured between the side walls of the cargo box substantially perpendicular to the side walls), the crossmember brackets 84 may be moved closer together along the crossmember 34 so that end portions of the crossmember 34 extending through the cutouts 84 is larger. Conversely, if the cargo box is wider, the end portions of the crossmember 34 extending through the cutouts 84 may be smaller and a distance between the crossmember brackets 84—and thus the uprights 32—may be greater. As a result, the rack 30 as described herein may beneficially allow for use of the rack 30 in multiple vehicles and may not require a user to purchase a variety of different sized racks 30.

Figure 6:
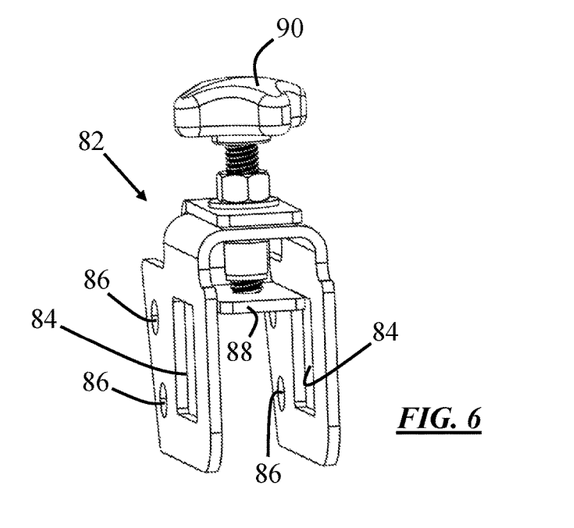
FIG. 6 is a perspective view of a crossmember bracket.

FIG. 6 illustrates a perspective view of the crossmember bracket 82 described in FIG. 5. The crossmember bracket 82 may include a pair of cutouts 84 in opposing walls of the crossmember bracket 82. The cutouts 84 may vary in size and/or shape. However, it is envisioned that the cutouts 84 may have a shape similar to that of the crossmember 34 to prevent unwanted rotation or movement of the crossmember 34. A channel may be formed between the cutouts 84 so that a portion of the crossmember 34 may be located within the channel.

Once the crossmember 34 is located within the chamber (i.e., within the crossmember bracket 82), a biasing member 90 may be tightened. The biasing member 90 may be a screw, bolt, pin, spring, or a combination thereof that may be manually tightened to engage a tab 88 of the crossmember bracket 82. To facilitate such tightening, the biasing member 90 may include a handle, knob, button, or other grip.

As the biasing member 90 is tightened and contacts the tab 88, the tab 88 is biased towards the portion of the crossmember 34 located within the channel of the crossmember bracket 82 until the tab 88 presses against the crossmember 34 and locks it in place. As such, the tab 88 may be integrally formed or otherwise connected to the crossmember bracket 82 yet be flexible or pliable enough to bend towards the crossmember 34. Similarly, the tab 88 may also be elastic enough to return to an original position when the biasing member 90 is loosened and released from contacting the tab 88. Thus, the crossmember bracket 82 may be secured anywhere along the crossmember 34 by simply adjusting the biasing member 90. Thereafter, or before, the crossmember bracket 82 may be secured to the upright 32 via one or more fasteners extending through mounting holes 86 within the crossmember bracket 82.

ELEMENT LIST

12 Cargo Box
14 Tailgate

16 Inner Panel of the Cargo Box
18 Top Edge of the Cargo Box
20 Interior of the Cargo Box
22 Fender
24 Lip of the Cargo Box
30 Rack
32 Upright
34 Crossmember
36 Gusset
38 Pin Hole of the Upright
40 Mounting Bracket
42 Channel
44 Lip of the Mounting Bracket
46 Flange
48 Retaining Fastener
50 Retaining Nut
52 Pin Hole of the Mounting Bracket
60 Attachment Bracket
62 Barrel
64 Pin Hole of the Attachment Bracket
66 Pin
68 Clip
70 Support Bracket
72 Receiving Portion
74 Bumper
76 Pin Hole of the Support Bracket
80 Mounting Hole of the Upright
82 Crossmember Bracket
84 Cutout of the Crossmember Bracket
86 Mounting Hole of the Crossmember Bracket
88 Tab
90 Biasing Member
100 Mounting Fastener
102 Secondary Attachment
D Direction of Extension of the Rack The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps.

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below", or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Unless otherwise stated, a teaching with the term "about" or "approximately" in combination with a numerical amount encompasses a teaching of the recited amount, as well as approximations of that recited amount. By way of example, a teaching of "about 100" encompasses a teaching of 100+/− 15.

The disclosures of all articles and references, including patent applications and publications, are incorporated by reference herein in their entirety for all purposes. Other combinations are also possible as will be gleaned from the following claims, which are also hereby incorporated by reference herein in their entirety into this written description.

What is claimed is:

1. A rack of a vehicle comprising:
   (a) a mounting bracket adapted to mount the rack to a cargo box of the vehicle;
   (b) an upright pivotally secured to the mounting bracket; and
   (c) a crossmember secured to the first upright, wherein the crossmember is adapted to span substantially across a width between opposing sides of the cargo box;
   wherein the rack is adapted to pivot between a stowed position and an extended position by pivoting the upright relative to the mounting bracket; wherein in the stowed position, the upright extends above and along a top surface of the cargo box of the vehicle;
   wherein the mounting bracket comprises a channel defined by an upper wall, a lower wall, and a connecting wall between the upper wall and the lower wall, wherein the channel is configured to receive a lip of the cargo box so that the lip is positioned between the upper wall and the lower wall, and wherein one or more retaining fasteners are configured to secure the mounting bracket to the cargo box, and
   wherein the rack comprises a support bracket having a receiving portion at an upper end region of the support bracket and configured to support the upright when the upright is pivoted into the stowed position; wherein the receiving portion is located at the upper end region of the support bracket such that a space or gap is defined between a bottom surface of the receiving portion and the upper wall of the mounting bracket.

2. The rack of claim 1, wherein the rack includes a pin that extends through aligned pin holes of the upright and the mounting bracket to secure the rack in the stowed position.

3. The rack of claim 2, wherein the mounting bracket includes a first pin hole associated with securing the rack in the stowed position and a second pin hole associated with securing the rack in the extended position.

4. The rack of claim 3, wherein the upright includes a single pin hole that aligns with the first pin hole of the mounting bracket in the stowed position and also aligns with the second pin hole of the mounting bracket in the extended position.

5. The rack of claim 4, wherein the first pin hole of the mounting bracket is located near a connection point between the upright and the mounting bracket.

6. The rack of claim 5, wherein the second pin hole of the mounting bracket is located on the support bracket connected to the mounting bracket.

7. The rack of claim 2, wherein the pin includes a clip that prevents unwanted removal of the pin when secured within the aligned pin holes of the upright and the mounting bracket.

8. The rack of claim 1, wherein the upright includes a plurality of mounting holes to secure the crossmember at multiple heights relative to the cargo box.

9. The rack of claim 8, wherein the crossmember is secured to the upright by a crossmember bracket fastened to the mounting holes.

10. The rack of claim 9, wherein the crossmember extends through a cutout of the crossmember bracket, and the crossmember bracket includes a tab that is biased against a surface of the crossmember via a biasing member to secure the crossmember in place.

11. The rack of claim 1, wherein the upright includes a bumper that abuts the mounting bracket when the rack is in the extended position.

12. The rack according to claim 1, wherein the mounting bracket comprises a flange that extends upwardly from the upper wall defining the channel, and the support bracket is connected to the connecting wall and to the flange.

13. The rack according to claim 12, wherein one or more retaining fasteners are configured to extend through the lower wall and engage the lip of the cargo box to secure the rack to the cargo box from below the lip.

14. The rack according to claim 12, wherein the rack comprises an attachment bracket that is secured to the connecting wall and to the flange, and the upright is pivotally attached to the mounting bracket in between the flange and the attachment bracket.

15. The rack according to claim 1, wherein the support bracket is connected to the flange that extends upwardly from the connecting wall by a fastener that extends across a width of the top wall.

16. The rack according to claim 15, wherein the upright is an L-shaped member comprising a first part that is pivotably connected to the mounting bracket, a second part that extends at an angle relative to the first part and is connected to the crossmember, and a gusset extends between the first part and the second part; and wherein the first part is shorter in length than the second part.

17. A rack of a vehicle comprising:
(a) a first mounting bracket and a second mounting bracket adapted to mount the rack to a top edge of a cargo box of the vehicle;
(b) a first upright pivotally secured to the first mounting bracket and a second upright pivotally secured to the second mounting bracket; and
(c) a crossmember secured to and spanning between the first upright and the second upright, wherein the crossmember is adapted to span substantially across a width between opposing sides of the cargo box;
wherein the rack is adapted to pivot between a stowed position and an extended position;
wherein in the stowed position, the upright extends above and along a top surface of the cargo box of the vehicle; and
wherein the rack comprises a first support bracket having a first receiving portion at an upper end region of the first support bracket and configured to support the first upright when the first upright is pivoted into the stowed position; wherein the first receiving portion is located at the upper end region of the first support bracket such that a space or gap is defined between a bottom surface of the first receiving portion and the first mounting bracket.

18. The rack of claim 17, wherein a width of the rack is adjustable to accommodate mounting of the rack to various cargo box sizes.

19. The rack of claim 18, the width of the rack is adjusted by adjusting a location of crossmember brackets along the crossmember that secure the crossmember to the first upright and the second upright.

20. A pair of the racks according to claim 19, wherein the pair of racks are adapted to support one or more objects spanning between the pair of racks.

* * * * *